3,238,012
ALUMINUM DERIVATIVES OF HIGHER
BORON HYDRIDES
William V. Hough, Valencia, Pa., assignor to Callery Chemical Company, Pittsburgh, Pa., a corporation of Pennsylvania
No Drawing. Filed Feb. 2, 1959, Ser. No. 790,763
5 Claims. (Cl. 23—14)

This invention relates to aluminum derivatives of higher boron hydrides and their preparation, and more particularly to aluminum derivatives of decaborane, $B_{10}H_{14}$, and triborane(7), $B_3H_7$, and methods of producing them in which a hydride compound of aluminum is utilized.

The hydrides of boron have only in recent years become of commercial interest in the chemical industry. Their chemistry is complex and because of their physical properties these compounds are difficult to study experimentally. For reasons such as these, few boron hydride derivatives having a boron to boron linkage have been prepared; metal derivatives in particular are little known and the few instances in which such metal polyboron hydrides have been reported are limited to certain alkali metal derivatives such as the sodium diborane, $Na_2B_2H_6$, reported by Stock in his early studies of the boron hydrides.

I have now found, and it is upon this discovery that this invention is predicated, that aluminum derivatives of certain higher boron hydrides exist and are produced in the reaction of decaborane or tetraborane with a hydride compound of aluminum. The compounds which I have discovered include aluminum tridecahydrodecaborate, $AlB_{10}H_{13}$, and aluminum tris(octahydrotriborate), $$Al(B_3H_8)_3$$

as well as intermediate compounds of the formula $$Al(BH_4)_{3-x}(B_{10}H_{13})_x$$

where $x$ is from 1 to 2 and $Al(BH_4)_{3-x}(B_3H_8)_x$ where $x$ is from 1 to 3. Such compounds are named herein in accordance with the rules set fourth by the Advisory Subcommittee on the Nomenclature of Organic Boron Compounds of the American Chemical Society in "The Nomenclature of Boron Compounds," issued May 15, 1956. These rules were proposed by Schaeffer and Wartik in Chem. Eng. News, 32, 1441 (1954), and Chem. Eng. News, 34, 560, 1956.

These compounds vary in their physical properties; for example, $Al(B_3H_8)_3$ is a clear, colorless glass like material while $AlB_{10}H_{13}$ is a yellow solid. The intermediate compounds $Al(BH_4)_2B_3H_8$, $AlBH_4(B_3H_8)_2$,

and $AlBH_4(B_{10}H_{13})_2$ have properties intermediate between those of $Al(BH_4)_3$, which is a volatile liquid, and those of the fully substituted aluminum derivatives of the higher boranes, i.e., $AlB_{10}H_{13}$ and $Al(B_3H_8)_3$. It may be noted that the compound $AlB_{10}H_{13}$ has an empirical formula which does not conform to that expected from normal valency relationships. For this reason, it is believed that this compound is normally polymeric when it is free of solvent. For similar reasons it is difficult to free this compound from the last traces of solvent.

The hydride compounds of aluminum which may be used to prepare the above materials include aluminum hydride, $AlH_3$, aluminum borohydride, $Al(BH_4)_3$, and lithium aluminum hydride, $LiAlH_4$. All of these hydrides react with both tetraborane, $B_4H_{10}$, and decaborane, $B_{10}H_{14}$, to produce aluminum derivatives of higher boron hydrides. Reaction of decaborane with aluminum hydride or lithium aluminum hydride produce $AlB_{10}H_{13}$. When aluminum borohydride is used the products are 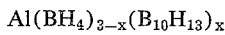 $Al(BH_4)_2B_{10}H_{13}$ and $AlBH_4(B_{10}H_{13})_2$ with the proportion of each depending upon the ratio of reactants used. In no case, however, did the reaction of aluminum borohydride with decaborane produce either $Al(B_{10}H_{13})_3$ or $AlB_{10}H_{13}$, even when an excess of decaborane was used.

Similar considerations apply when tetraborane is reacted with a hydride compound of aluminum. Thus, aluminum hydride and lithium aluminum hydride each reacts with tetraborane to produce $Al(B_3H_8)_3$, while the reaction of aluminum borohydride with tetraborane produces $Al(BH_4)_2B_3H_8$ and $AlBH_4(B_3H_8)_2$ as well as $Al(B_3H_8)_3$, with the exact composition of the product mixture depending upon the ratio of reactants used.

Certain of the reactions require the use of a solvent, while others may be carried out in solvents if desired although a solvent is not necessary. Thus the reaction of decaborane with aluminum hydride or with lithium aluminum hydride requires a solvent, while the reaction of decaborane with aluminum borohydride takes place with or without a solvent. On the other hand, the reactions of tetraborane with these hydride compounds of aluminum requires the use of a solvent only in the case of aluminum hydride. It is preferred, however, to carry out the reaction of tetraborane with lithium aluminum hydride, and to a lesser extent the reaction with aluminum borohydride, in a solvent because higher yields and better-defined products are thereby obtained. In many cases, however, the reactions are carried out without a solvent if possible in order to obtain the unsolvated products, since the products are generally obtained as solvates when a solvent is used thus making additional purification necessary if the unsolvated product is desired. The recovery of the products is always effected through conventional techniques, such as vacuum distillation, extraction, or other methods. The degree of purity desired, of course, determines in large part which recovery method is used, but the nature of the reaction system must also be considered. For example, when lithium aluminum hydride is a reactant, the product must be separated from the by-product lithium compound.

At present, ethers provide the preferred class of solvents for use in the cases where a solvent is required. While other liquid Lewis bases, i.e. compounds which are electron donors, may be used as a solvent, these are usually less desirable than the ethers because they tend to solvate the product to a greater extent than do the ethers. In the cases where a solvent is not necessary, but it is desired to use a solvent, any liquid may be used, including, for example, hydrocarbons such as pentane, hexane, and 2,3-dimethylbutane, as well as the Lewis base solvents. As is the case whenever a solvent is used in a chemical process, it must be substantially inert, i.e., it must not react in an undesired manner with the reactants and products.

The ethers which comprise the preferred class of solvents include any ether which is a liquid, and thus useful as a solvent, including alkyl ethers, cyclic ethers, and glycol ethers. Some specific examples of ethers which may be used are ethyl ether, butyl ether, isopropyl ether, ethyl-phenyl ether, propylene oxide, dioxane, tetrahydrofuran, tetrahydropyran, 1,2-dimethoxyethane, triethyleneglycol dimethylether, and diethyleneglycol diethylether. Among the other Lewis base solvents which may be used if desired are the liquid amines, such as mono, di, and tri-lower alkyl amines, pyridine and lutidine; thio-ethers, such as dimethyl sulfide and thiophene; alkyl phosphines, such as the methyl and ethyl phosphines; and the alkyl arsines, such as the methyl arsines.

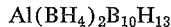

The reaction conditions are not critical so that operability of the various embodiments of the method described herein does not depend upon any particular temperature or pressure. Thus room temperature and atmospheric pressure may be used in carrying out the reactions. When a solvent is not used with decaborane as a reactant it is preferred to heat the reaction mixture moderately, i.e. to about 70–80° C., because these reactions take place slowly at ordinary room temperature. Since tetraborane tends to decompose at relatively low temperatures, heating is usually not employed with reactions systems in which this hydride is present. Thus, advantageous use of elevated temperatures is practically limited to the reaction of aluminum borohydride with decaborane, although the other reactions of decaborane in which a solvent is used are carried out with heating in some instances.

The examples which follow will illustrate this invention, but are not construed as imposing limitations thereon.

*Example I.*—3.49 millimols of aluminum hydride ($AlH_3$) were prepared in 100 millimols of ethyl ether in a glass reaction tube to which 7.21 millimols of decaborane ($B_{10}H_{14}$) were added. After 1 hour at room temperature the tube was opened and the products were analyzed. It was found that reaction had taken place according to the equation $$AlH_3 + B_{10}H_{14} \rightarrow AlB_{10}H_{13} + 2H_2$$

Similar results were obtained when 1.97 millimols of $AlH_3$ were reacted with 3.58 millimols of $B_{10}H_{14}$, using 50 millimols of tetrahydrofuran as the solvent.

*Example II.*—3.76 millimols of aluminum borohydride, $Al(BH_4)_3$, and 4.70 millimols of decaborane were heated together to 100° C. for 3 hours. A liquid product was obtained which crystallized upon cooling to room temperature. This product was identified through the stoichiometry of the reaction coupled with chemical and infra-red analysis of the product as $Al(BH_4)_2B_{10}H_{13}$.

Other tests with these reactants but using such ethers as dioxane, ethyl ether, and tetrahydrofuran as solvents produced comparable results. The materials produced varied in composition, depending upon the ratio of reactants, and in some cases were mixtures having an overall composition of $Al(BH_4)_{3-x}(B_{10}H_{13})_x$ where $x$ was between 1 and 2.

*Example III.*—1.41 millimol of lithium aluminum hydride, $LiAlH_4$, and 3.77 millimols of decaborane were reacted on 26.5 millimols of tetrahydrofuran for 18 hours at room temperature. Evaporation of the resulting yellow-orange solution yielded a yellow solid, which was shown by chemical analysis and infra-red studies to have the empirical formula $AlB_{10}H_{13}$, along with other unidentified materials.

In similar tests using ethyl ether as the solvent, the reaction proceeded somewhat more slowly and the product was recovered as a precipitate.

*Example IV.*—A tube containing 2 milliliters of ethyl ether was charged with 2.02 millimols of aluminum borohydride and 8.16 millimols of tetraborane, $B_4H_{10}$. After 16 hours at room temperature, the tube was opened and the products were analyzed. It was found that the reaction had proceeded according to the equation $$Al(BH_4)_3 + B_4H_{10} \rightarrow Al(B_3H_8)_3 + B_2H_6$$

This reaction, when carried out at room temperature in the absence of solvents and using less tetraborane, gave intermediate products of empirical formula $$Al(BH_4)_{3-x}(BH_3H_8)_x.$$

In these and other tests it was found that as the reaction of $Al(BH_4)_3$ with tetraborane proceeds and diborane is evolved, the product becomes more viscous and less volatile as $B_3H_8$ units are substituted for $BH_4$ units. The final product, $Al(B_3H_8)_3$, is so viscous and non-volatile that it is a glassy material.

Other tests, conducted similarly to those described above, in which aluminum hydride or lithium aluminum hydride was reacted with tetraborane, also gave products which were shown to be aluminum derivatives of triborane(7). When a Lewis base solvent was used in these reactions, the products were obtained solvated with the Lewis base.

The aluminum derivatives of decaborane and triborane(7) produced in accordance with this invention are useful as fuels and fuel additives. Because of their high energy output when combusted with conventional oxidizers such as air or oxygen, they increase the heating value of any fuel with which they are used. These compounds and compositions, and in particular in their unsolvated form, may also be used alone as fuels in engines such as turbojets and rockets. When used therein in conjunction with oxidizers such as liquid oxygen and perchlorates they produce more thrust than is produced from the usual hydrocarbon fuels.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. A method of producing aluminum derivatives of decoborane which comprises contacting decaborane, $B_{10}H_{14}$, with aluminum borohydride, $Al(BH_4)_3$, and recovering the aluminum derivatives of decaborane thus formed.

2. A method of producing aluminum derivatives of triborane(7) which comprises contacting tetraborane, $B_4H_{10}$, with aluminum borohydride, $Al(BH_4)_3$ and recovering the aluminum derivatives of triborane(7) thus formed.

3. As new compositions of matter, $$Al(BH_4)_{3-x}(B_{10}H_{13})_x$$

where $x$ is from 1 to 2.

4. As new compositions of matter, $$Al(BH_4)_{3-x}(BH_3H_8)_x,$$

where $x$ is from 1 to 3.

5. The new composition of matter having the empirical formula $AlB_{10}H_{13}$.

References Cited by the Examiner

UNITED STATES PATENTS 2,567,972   9/1951   Schelsinger _____ 23—204 X

OTHER REFERENCES

Carpenter: "A.R.S. Journal," vol. 29, No. 1, pp. 10, 11, January 1959.

Edwards: "16th International Congress of Pure and Applied Chemistry, Paris, 1957, Papers Presented to the Section on Inorganic Chemistry," pages 475–481, Butterworth Scientific Publication, London (1958).

Finholt: "J. Am. Chem. Soc.," vol. 69, pp. 1199–1203, May 1947.

Finholt: "Progress Report, Contract NO₂(s) 9901" 5 pages, October 23, 1948, declassified March 19, 1956.

Hough et al.: "J. Am. Chem. Soc.," vol. 78, p. 689, February 5, 1956.

Lipscomb: "J. Phys. Chem.," vol. 62, pp. 381, 382, March 1958.

BENJAMIN HENKIN, *Primary Examiner.*

LEON D. ROSDOL, ROGER L. CAMPBELL,
*Examiners.*

UNITED STATES PATENT OFFICE
CERTIFICATE OF CORRECTION

Patent No. 3,238,012                            March 1, 1966

William V. Hough

It is hereby certified that error appears in the above numbered patent requiring correction and that the said Letters Patent should read as corrected below.

Column 3, line 67, the right-hand portion of the formula should appear as shown below instead of as in the patent:

$$(B_3H_8)_x$$

column 4, line 45, the right-hand portion of the formula should appear as shown below instead of as in the patent:

$$(B_3H_8)_x$$

Signed and sealed this 1st day of August 1967.

(SEAL)
Attest:

EDWARD M. FLETCHER, JR.                    EDWARD J. BRENNER
Attesting Officer                                 Commissioner of Patents